Dec. 19, 1933.  C. T. PFLUEGER  1,940,604
FISH LURE
Filed July 11, 1931

INVENTOR
CHARLES T. PFLUEGER

BY Ely & Barrow

ATTORNEYS

Patented Dec. 19, 1933

1,940,604

UNITED STATES PATENT OFFICE 1,940,604

FISH LURE

Charles T. Pflueger, Akron, Ohio, assignor to The Enterprise Manufacturing Company, Akron, Ohio, a corporation of Ohio Application July 11, 1931. Serial No. 550,151

5 Claims. (Cl. 43—42)

This invention relates to fish lures, and more especially to lures comprising a spoon body having a hook secured to the body and extending rearwardly therefrom. The invention is particularly adapted and intended as a light spoon for fly casting.

The chief objects of the invention are to provide a fish lure or spoon body that constitutes a reinforcement for a fish hook of light weight, and as the spoon body is light the hook and the body will mutually reinforce one another and give additional rigidity to the bait without increasing the weight. The lure also comprises a flipper or vibratory plate attached to the hook, and the invention comprises means to provide for greater freedom of movement of a flipper attached to the hook; to provide for retaining the flipper relatively close to the barb of the hook; and to facilitate the assembling of the flipper, hook, and spoon of the lure.

Of the accompanying drawing.

Figure 1:
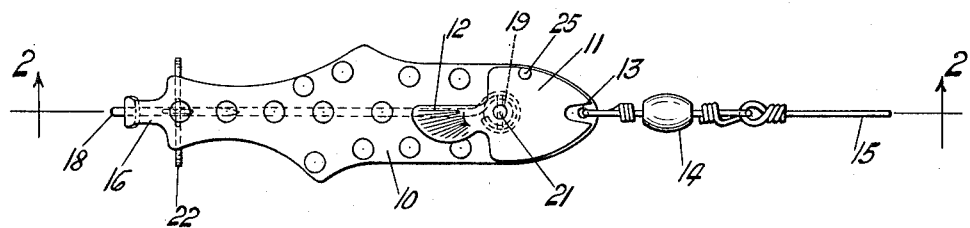
Figure 1 is an inverted view of a fish lure embodying the invention in its preferred form.

Referring to the drawing, 10 is a spoon constituting the body portion of the lure, said spoon being slightly concavo-convex in a transverse direction, and substantially straight longitudinally except at one end portion which is arcuate. The spoon may have any desired form, that shown simulating a fish, the longitudinal arcuate portion of the spoon constituting the tail of the fish. On the convex side of the spoon may be secured a plate 11 in the form of a fish head having a rearward extension 12 similar in shape to a fin or gill. The spoon consists of metal and may have any finish desired, that shown having a mottled or spotted upper surface and plain polished under surface, the head portion 11 being plain. The front end of the spoon is formed with an aperture 13 for the permanent attachment of a swivel 14, and a fish line 15 may be secured to the latter. The arcuate tail portion of the spoon is formed with a relatively narrow, centrally-disposed extension 16 terminating in a forwardly bent lug 26 that is formed with an aperture 17, the latter being just large enough to embrace the hook, but too small to permit the barb of the hook to pass therethrough.

Figure 2:
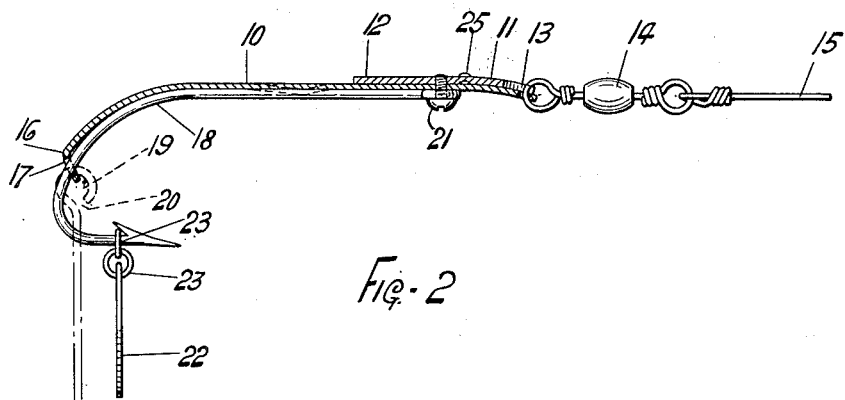
Figure 2 is a section on the line 2—2 of Figure 1, showing, in dotted line, the manner in which the several parts of the lure are assembled.
Figure 3:
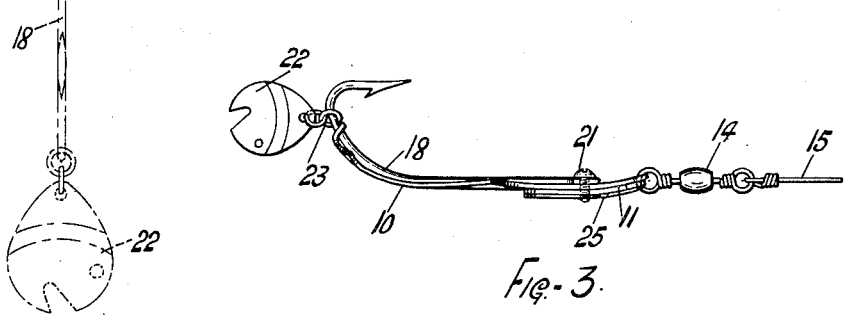
Figure 3 is a view showing the normal position of the spoon as it rides in the water.

Mounted upon the concave or under side of the spoon 10 is a fish hook 18 having the usual barb at one end and having its opposite end formed with an open loop or eye 19, that is, the material defining the eye does not define a complete circle, but a circle having an opening therein as indicated at 20, Figure 2. The hook 18 extends through the aperture 17 in the extension 16 of the spoon, and is secured to the spoon by a round head screw 21 that passes through the eye 19 and is threaded into the plate 11 so as to afford a secure anchorage for the hook. The screw also holds the plate in position, the latter acting as a keel or weight to assist in maintaining the spoon with its concave side upright in the water. In order to prevent rotation of the plate on the spoon, the spoon body and the plate may be provided with a mating recess and projection, as shown at 25, which act as a dowel.

Mounted upon the hook 18, between the spoon extension 16 and the barb of the hook, is a flat plate of polished metal constituting a flipper 22, the same being suspended from the hook by a pair of rings or links 23, 23. A spinner and swivel may be substituted for the flipper.

The feature of the arcuate tail portion on the spoon 10 permits said portion to engage the hook well onto the curved shank of the latter, and, being disposed upon the convex side of the hook, effectively reinforces the hook so that the latter will resist relatively heavy pull without straightening. In assembling, the lure body may be placed under a slight tension by forming it with slightly less curvature at the end than found on the hook. In attaching, the lure body will be bent slightly to conform to the hook.

The arrangement also serves to limit the travel of the flipper along the hook, keeping it relatively close to the barb so that the latter is more likely to engage a fish that is striking at the flipper. The double ring mounting for the flipper provides a greater range of movement than other forms of mounting for a lure of this type and makes a more attractive bait.

The open eye on the hook assists in the assembly of the lure as the hook can be mounted on the spoon by inserting the metal of the spoon at the tip or tail of the spoon through the aperture 20 and then moving the hook through the aperture until it reaches the position where it is secured to the spoon. The hook can be easily replaced by the fisherman in case of damage. This formation also permits the easy assembly of the flipper or spinner 22. Because the aperture 17 is relatively small and closely embraces the hook, there is no separation of lure body and hook, and they mutually support each other to provide a rigid structure of light weight.

The invention provides a fish lure of relatively light yet strong construction, and accomplishes the other objects set out in the foregoing statement of objects.

Modifications may be resorted to without departing from the spirit of the invention or the scope of the appended claims which are not limited to the specific construction shown and described. While a flipper is shown in the drawing, a spinner may be mounted in the same location.

What is claimed is:

1. The combination of a lure body having a longitudinally arcuate end portion formed with an aperture at the extremity thereof, and a hook supported throughout its length on the upper side of the lure body extending through said aperture and secured to the lure along the longitudinal axis thereof, a part of the bend of the hook lying upon and supported by the concave surface of the arcuate end portion of the lure body.

2. The combination of a lure body having a longitudinally arcuate end portion formed with a forwardly extending lug on the extremity thereof, said lug being provided with an aperture, and a hook extending through said aperture and secured to the lure along the longitudinal axis thereof, a part of the bend of the hook lying upon and supported by the concave surface of the arcuate end portion of the lure body.

3. The combination of a lure body having an arcuate end portion formed with a relatively small aperture at the extremity thereof, a hook extending through said aperture and along the concave side of the body, said hook substantially filling said aperture, a lure on the bend of the hook, said hook having a barb at one end and an open loop at the other end, the open loop permitting assembly of the hook, lure and body, and a screw passing through said loop and threaded into the body for fixedly securing the hook thereto.

4. A combination as defined in claim 3 including a multiple ring connection for mounting the lure on the hook between the barb and the body.

5. A fish lure comprising a body, a plate attached to one side of the body, a hook on the body, means to secure the hook plate and body together comprising a screw passing through the eye of the hook and through the body into the plate, and a dowel to prevent rotation of the plate about the screw.

CHARLES T. PFLUEGER.